Patented Apr. 17, 1934

1,955,554

UNITED STATES PATENT OFFICE 1,955,554

ANTIRACHITIC PRODUCT AND METHOD OF MAKING SAME

Robert F. Light, Yonkers, and Charles N. Frey, New York, N. Y., assignors to Standard Brands Incorporated, New York, N. Y., a corporation of Delaware No Drawing. Application April 21, 1931, Serial No. 531,846

12 Claims. (Cl. 167—81)

This invention relates to methods of treating activatable unsaponifiable lipoids, particularly ergosterol, with wave energy having a frequency below the visible spectrum and has, as a general object, the provision of a novel, efficient and economical process for such treatment.

A particular object of the invention is to provide a new process of imparting vitamin potency to ergosterol by treating the same dissolved in a solvent, such as diethylene dioxide, which has properties of functional advantage in the process of activation and in the finished product.

Another object of the invention is to provide a process of irradiating activatable unsaponifiable lipoids such as ergosterol, in a liquid in which the ratio of solubility of the lipoid after activation to the solubility of the unactivated lipoid is in the order of 3 to 1, or above.

A still further object is to provide a stable solution containing an activated unsaponifiable lipoid, said solution having an antirachitic potency in excess of five thousand times that of standard cod-liver oil.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the application of which will be indicated in the claims.

The action of sun-light, or more or less concentrated bands in the ultra-violet region, on the production of vitamin D has been technically recognized for the last decade. Various methods of accomplishing this result have been described in the literature and certain of them have been commercially applied. For example, in addition to the well known methods of irradiating food substances and unsaponifiable lipoids in the solid condition, it has been suggested to irradiate activatable unsaponifiable lipoids in ordinary solvents, such as alcohol, ether, ethyl acetate and the like with energy in the ultra-violet region, but we have found that by such practice considerable difficulty is encountered in the production of commercially useful antirachitic potencies, and that the maximum antirachitic potency of solution attainable when thus using any solvent heretofore suggested is not in excess of five thousand times that of standard cod-liver oil.

In accordance with the principles of the present invention, we have found that if an activatable unsaponifiable lipoid, such as ergosterol, is dissolved in or admixed with diethylene dioxide, (having the probable formula:

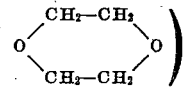

it may be exposed to light having a wide frequency band and thereby an antirachitic potency of from six thousand up to twenty thousand or more times that of standard cod-liver oil is produced. Moreover, as indicative of the improved efficiency resultant from our invention, it may be noted that, when an artificial source of light, such as a quartz mercury vapor lamp, is employed, for a given amount of energy used in the production of the light, the efficiency of the irradiation is 7½ or more times that of irradiation of ergosterol in alcohol and other solvents heretofore used. Thus the activation of ergosterol may be effected by using during the irradiation a solvent that is capable of holding in stable solution an antirachitic potency of over 6000 times that of standard cod liver oil or, somewhat more particularly, irradiating in the presence of a liquid in which ergosterol is soluble to about 5% when unactivated and upwards of 20% or more when activated.

As a specific example of the manner in which such activation can be carried out, but not in limitation of our invention, we give the following detailed procedure:

Approximately 20 grams of untreated ergosterol is mixed with 80 ccs. of diethylene dioxide and placed in an enameled pan having dimensions of approximately 9 x 11 inches. Over this is disposed a quartz mercury vapor lamp, operating at 170 volts, 4 amperes and at a distance of 12 inches; the irradiation being continued for a period of approximately 120 minutes.

During the irradiation the ergosterol in suspension becomes activated and, by reason of its then higher solubility in the diethylene dioxide, goes totally into solution, and the resulting solution has an antirachitic potency of approximately twenty-four thousand times that of standard cod-liver oil.

Other types of mercury vapor lamps, having tubes either of quartz or quartz substitutes, or sources of ultra-violet light such as carbon or metallic arcs, or sunlight, or diffracted bands thereof, may be used if desired, without departing from the spirit of the invention.

Use may also be made, if desired, of the high ratio of the solubilities of activated ergosterol as compared with unactivated ergosterol in diethylene dioxide, as will be readily understood by one skilled in the art, so that a larger amount of ergosterol can initially be mixed with the solvent at the beginning or during the treatment if desired, and at the end of the treatment the solution may be separated from any remaining undissolved ergosterol so that it contains substantially only activated material. In other words, the relation of potency to percentage of activated ergosterol and solvent is, moreover, such that dispersion of the product in consumable form and dosage entails a largely reduced amount of the solvent vehicle. Diethylene dioxide, or compatible lipoid solvents containing the same, are therefore also useful as solvents for antirachitically active concentrates however prepared; such solutions being adapted to be mixed with food carrying materials and the solvent being readily evaporatable.

Although the specific example above given is for treatment in a batch process, it is also to be understood that without departing from the spirit of the invention the treatment may be carried out continuously by exposing the solution or suspension of ergosterol in thin layers to the action of the light by flowing the solution past the lamp or other light source.

In speaking of light-wave energy in the present invention, we mean to include not only a light which includes all of the wave lengths within the ultra-violet region with or without other wave lengths, but also any activating band or bands thereof which may be attained by separate filtration or diffraction. Such filtration has been asserted to be desirable because it prevents what is commonly referred to as "over irradiation" or destruction of the irradiated ergosterol possibly by other wave lengths which may act to destroy or harm the irradiated material. We have found, however, that in our process such separate filtration is unnecessary and, in fact, deem it to be undesirable, in that it reduces the intensity of the light which ultimately reaches the solution being treated and consequently requires a longer time of treatment with a given apparatus to obtain the same degree of potency.

It will thus be seen that by means of the present invention, there has been provided a novel and efficient process of antirachitic activation of activatable unsaponifiable lipoids to the production of a solution of activated material having a potency far in excess of those heretofore attainable, and since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Particularly it is to be understood that in said claims, ingredients or compounds recited in the singular are intended to include compatible mixtures of such ingredients wherever the sense permits. For example, when ergosterol is mentioned, it may be either in the purified state or admixed with other unsaponifiable lipoids or such impurities as commonly are present therewith; and where diethylene dioxide is mentioned, it is to be understood that it may be mixed with other liquids which are soluble or miscible therewith and which will transmit ultra-violet light, without departing from the spirit of the invention.

Having described our invention, what we claim as new and desire to secure by Letters Patent, is:

1. A process of activating antirachitically activatable unsaponifiable lipoids which comprises mixing such a lipoid with diethylene dioxide, and subjecting the resultant composition to the action of activating light wave energy containing frequencies below the visible spectrum.

2. A process of activating antirachitically activatable unsaponifiable lipoids which comprises mixing such a lipoid with diethylene dioxide, and subjecting a thin film of the resultant composition to the action of activating light wave energy containing frequencies below the visible spectrum.

3. A process of activating ergosterol which comprises subjecting it to the action of activating light-wave energy containing frequencies below the visible spectrum in the presence of a liquid in which it is soluble to about 5% when unactivated and upwards of 20% or more when activated.

4. A process of activating ergosterol which comprises subjecting ergosterol in the presence of diethylene dioxide to the action of activating light-wave energy containing frequencies below the visible spectrum.

5. A process of activating ergosterol which comprises subjecting a mixture of ergosterol and a liquid containing diethylene dioxide to the action of ultra-violet light.

6. A new composition of matter comprising an antirachitically active concentrate dissolved in diethylene dioxide.

7. A new composition of matter comprising a concentrate of an activated unsaponifiable lipoid in a solution containing diethylene dioxide, said solution having an antirachitic potency of at least six thousand times that of standard cod-liver oil.

8. A new composition of matter comprising a concentrate of an activated unsaponifiable lipoid in solution in diethylene dioxide, said solution having an antirachitic potency of approximately twenty-four thousand times that of standard cod-liver oil.

9. A solvent for antirachitically activated unsaponifiable lipoids comprising diethylene dioxide.

10. A solvent for antirachitically activated ergosterol comprising diethylene dioxide.

11. In a process of making an activated ergosterol product, the step which comprises irradiating an ergosterol containing material by subjecting said material to the action of activating light wave energy containing frequencies below the visible spectrum in a solvent containing diethylene dioxide.

12. In a process of making an activated ergosterol product, the step which comprises irradiating an ergosterol containing material by subjecting said material to the action of activating light wave energy containing frequencies below the visible spectrum in a solvent capable of holding in stable solution an antirachitic potency over 6000 times that of standard cod liver oil.

ROBERT F. LIGHT.
CHARLES N. FREY.